(12) United States Patent
Helline et al.

(10) Patent No.: US 10,308,163 B2
(45) Date of Patent: Jun. 4, 2019

(54) CHAIN BINDER AND METHOD OF OPERATION

(71) Applicants: Steven M. Helline, Massillon, OH (US); Dennis Morgan, Lakeville, OH (US)

(72) Inventors: Steven M. Helline, Massillon, OH (US); Dennis Morgan, Lakeville, OH (US)

( * ) Notice: Subject to any disclaimer, the term of this patent is extended or adjusted under 35 U.S.C. 154(b) by 277 days.

(21) Appl. No.: 15/448,784

(22) Filed: Mar. 3, 2017

(65) Prior Publication Data
US 2018/0251063 A1    Sep. 6, 2018

(51) Int. Cl.
*B60P 7/08* (2006.01)

(52) U.S. Cl.
CPC .............. *B60P 7/0853* (2013.01); *B60P 7/08* (2013.01)

(58) Field of Classification Search
CPC ....... B60P 7/0853; B60P 7/083; B60P 7/0846; B60P 7/08
See application file for complete search history.

(56) References Cited

U.S. PATENT DOCUMENTS

| | | | |
|---|---|---|---|
| 3,065,007 A * | 11/1962 | Colmer, Jr. | F16G 11/12 24/279 |
| 3,338,359 A * | 8/1967 | Baillie | B60P 7/083 192/43.1 |
| 4,223,869 A | 9/1980 | Patterson, III et al. | |
| 4,830,339 A | 5/1989 | McGee et al. | |
| 4,993,687 A | 2/1991 | Crook et al. | |
| 5,611,521 A | 3/1997 | Grover et al. | |
| 5,911,409 A | 6/1999 | Grover | |
| 6,176,145 B1 * | 1/2001 | Jackson | F16H 25/20 254/231 |
| 7,055,804 B2 * | 6/2006 | Scott | B60P 7/083 254/231 |
| 7,552,913 B1 | 6/2009 | Amoss et al. | |
| 8,152,139 B2 | 4/2012 | Wang | |
| 8,166,831 B2 * | 5/2012 | Ruan | B60P 7/083 73/862.42 |

(Continued)

OTHER PUBLICATIONS

TrucknTow.com website—http://www.truckntow.com/images/Product/large/LBR1O-H.jpg—document is undated but was printed on Feb. 15, 2013.

*Primary Examiner* — Michael E Gallion
(74) *Attorney, Agent, or Firm* — Sand, Sebolt & Wernow Co., LPA

(57) ABSTRACT

A chain binder to connect and apply tension to chains used to secure cargo on a truck bed. The chain binder includes a center body; a first side assembly; a second side assembly; and a power coupling provided on the center body. The first side assembly engages a first chain section and the second side assembly engages a second chain section. The power coupling couples a gear mechanism in the center body to an external power source. Operation of the power coupling moves the first and second side assemblies toward each other when operated in a first direction and moves the first and second side assemblies away from each other when operated in a second direction. As the first and second side assemblies move toward each other, tension in the chains increases and as the side assemblies move away from each other tension in the chain decreases.

23 Claims, 14 Drawing Sheets

(56) References Cited

U.S. PATENT DOCUMENTS

| | | | | |
|---|---|---|---|---|
| 8,434,979 B1* | 5/2013 | Genge | ............... | B60P 7/083 |
| | | | | 410/103 |
| 8,505,879 B2* | 8/2013 | Ruan | ............... | B25B 13/48 |
| | | | | 254/232 |
| 10,088,016 B2* | 10/2018 | Bujold | ............... | B60P 7/0853 |
| 2014/0061556 A1* | 3/2014 | Knox | ............... | B60P 7/083 |
| | | | | 254/220 |
| 2014/0109361 A1* | 4/2014 | Helline | ............... | B60P 7/083 |
| | | | | 24/68 CD |
| 2016/0195165 A1* | 7/2016 | Chou | ............... | F16G 11/12 |
| | | | | 74/88 |
| 2016/0273644 A1 | 9/2016 | Niu | | |
| 2017/0355298 A1* | 12/2017 | Cahall | ............... | B60P 7/0853 |

* cited by examiner

CHAIN BINDER AND METHOD OF OPERATION

BACKGROUND OF THE INVENTION

Technical Field

Generally, the current disclosure relates to a chain binder used to secure chains together. Specifically, the current disclosure relates to a chain binder that incorporates a center body, a first side assembly, a second side assembly and a power coupling provided on the center body that engages an external power source; whereby operation of the power coupling moves the first and second side assemblies toward each other when operated in one direction and moves the first and second side assemblies away from each other when operation in a second direction.

Background Information

There are a variety of chain binders on the market that may be used to secure different types of loads on vehicles. For example, ratchet binders or lever binders are known for this purpose.

However, conventional chain binders or chain binder systems for tightening chains or straps that hold down freight are fabricated such that a user may have to apply his/her own force to a lever lock on the chain binder to tighten the chain or strap. In other words, the user must personally apply pressure to the lever lock of the chain binder. Lever binders, for example, use a simple lever mechanism to remove tension on the chain or strap so that an operator can attach the chain binder to the chain. Once attached, the operator will pull on the lever. Although the design seems simple it requires a lot of strength from the operator to tighten the length of the strap or chain with the lever binder. Sometimes, due to lack of sufficient force applied on the lever when engaged with the chain, the chain binder's lever will bounce back against the operator, possibly hurting him or her.

SUMMARY

There may be therefore a need for an improved chain binder and a method of operating the same that can aid in reducing the risk to the operator and which may require less strength to operate.

The current disclosure relates to a chain binder that may be used to more safely bind cargo or freight on a platform such as an a flatbed truck or bed of a rail car. The current disclosure relates to a chain binder that incorporates a center body with a power coupling. An external power source, such as a hand-held powered drill, may be coupled to the power coupling. Actuation of the power source causes the chain binder to adjust the tension in a chain, strap or rope used to secure freight to a truck bed or bed of a rail car.

The term "truck bed" as used herein should be understood to include, but may be not limited to, any type of bed, platform, pallet, skid, container or any other generally horizontal or generally vertical, or inclined surface on any type of vehicle, vessel or aircraft, or upon the ground and upon which any type of load, freight, cargo, object or equipment may be secured using chains, straps, cables, wires or ropes or any other types of elongate securement members that have to be adjusted in length from time to time.

The term "cargo" as used herein should be understood to include, but may be not limited to, any size, shape or type of load, freight, cargo or equipment that may be restrained by straps, chains or ropes on a truck bed.

The term "chain" as used herein should be understood to include, but may be not limited to, any type of securement used to restrain or secure cargo on a truck bed including such as chains, straps and ropes.

A chain binder to connect and apply tension to two chain sections used to secure cargo on a truck bed may be disclosed herein. The chain binder includes a center body; a first side assembly; a second side assembly; and a power coupling provided on the center body. The first side assembly engages a first chain section and the second side assembly engages a second chain section. The power coupling couples a gear mechanism in the center body to an external power source. Operation of the power coupling moves the first and second side assemblies toward each other when operated in a first direction and moves the first and second side assemblies away from each other when operated in a second direction. As the first and second side assemblies move toward each other tension in the chain increases and as the side assemblies move away from each other tension in the chain decreases.

In one aspect, an embodiment of the present disclosure may provide a chain binder comprising a center body; a first side assembly; a second side assembly; and a power coupling provided on the center body; wherein the power coupling may be adapted to couple to an external power source; wherein operation of the power coupling moves the first side assembly and the second side assembly towards each other when operated in a first direction; and operation of the power coupling moves the first side assembly and the second side assembly away from each other when operated in a second direction.

In another aspect, an embodiment of the present disclosure may provide, in combination a chain binder comprising a center body; a first side assembly; a second side assembly; and a power coupling provided on the center body; and a power source; wherein the power coupling may be selectively coupled to the power source; and wherein actuation of the power source operates the power coupling; wherein operation of the power coupling moves the first side assembly and the second side assembly towards each other when operated in a first direction; and operation of the power coupling moves the first side assembly and the second side assembly away from each other when operated in a second direction.

In yet another aspect, an embodiment of the present disclosure may provide a method of adjusting the tension in a securing member that secures cargo to a support surface, said method comprising steps of providing a center body, a first side assembly and a second side assembly; engaging a first securing member section with the first side assembly; engaging a second securing member section with the second side assembly; engaging a power coupling provided on the center body to an external power source; actuating the external power source; operating the power coupling in a first direction to move the first and second side assemblies towards each other; or operating the power coupling in a second direction to move the first and second side assemblies away from each other. The method may further include a step of preventing rotation of a lever lock provided on the center body prior to operating the power coupling in either of the first direction or the second direction. The step of preventing rotation of the lever lock comprises wedging a part of the lever lock between a first region and a second region on one or both of the cargo and the support surface.

BRIEF DESCRIPTION OF THE SEVERAL VIEWS OF THE DRAWINGS

A sample embodiment of the invention may be set forth in the following description, may be shown in the drawings and may be particularly and distinctly pointed out and set forth in the appended claims.

Similar numbers refer to similar parts throughout the drawings

DETAILED DESCRIPTION

The present disclosure relates to a chain binder for securing cargo on a truck bed on a vehicle. The chain binder may also be used to hold a first object to a second object, for example for securing two large boxes together. Furthermore, the present disclosure relates to a method of using a chain binder for the described purpose.

Figure 1:
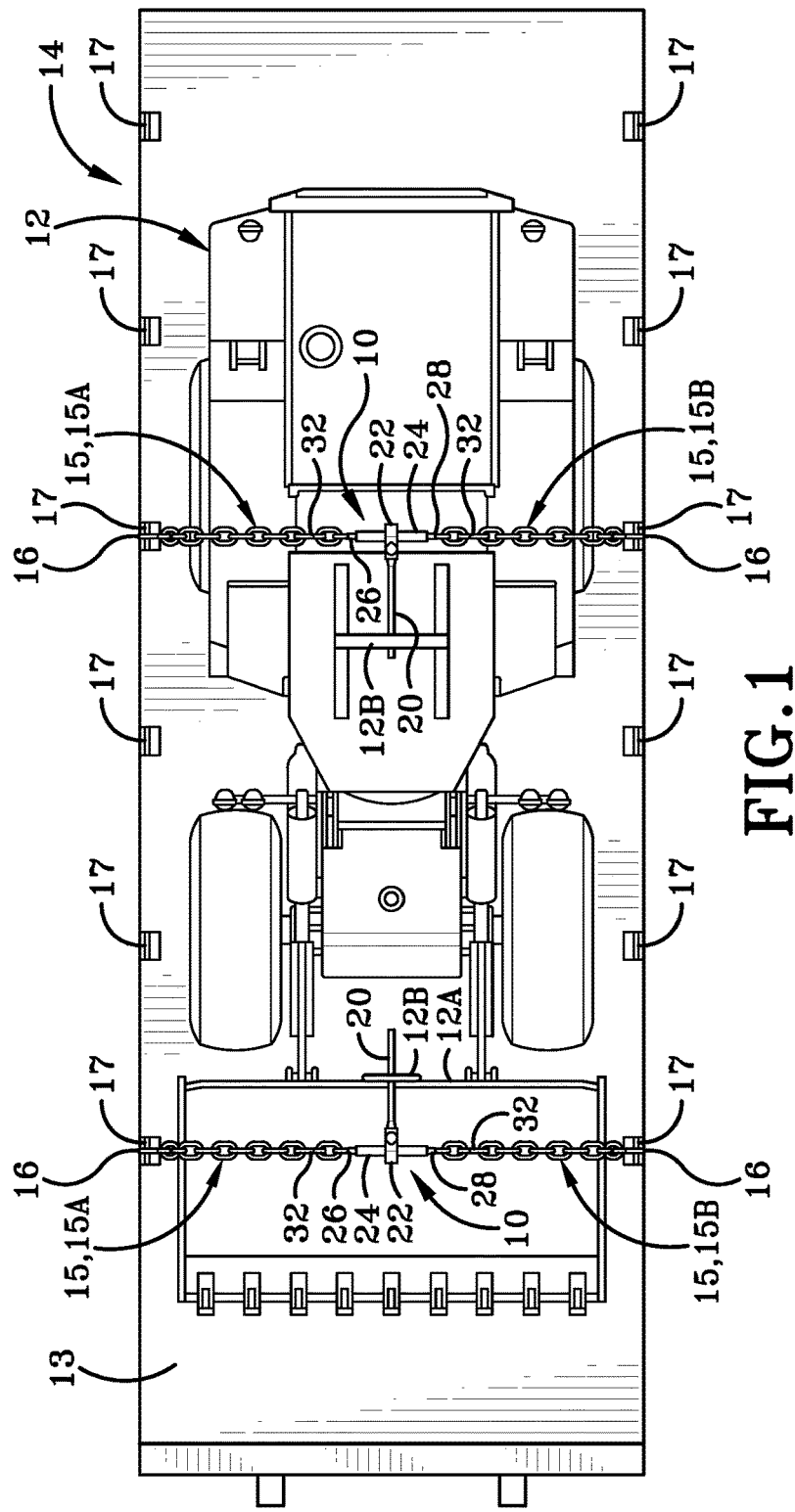
FIG. 1 is a front elevation view of a plurality of chain binders in accordance with an aspect of the present invention shown engaged with chains that secure cargo on a truck bed, where the chain binders are placed adjust a top end of the cargo.

FIG. 1 depicts a first exemplary manner in which a chain binder in accordance with an aspect of the present invention may be used. The chain binder may be represented in the figures by the reference number 10. Chain binder 10 may be used to increase or decrease tension in securement members 15, 15A or 15B that hold cargo 12 against a surface, for example against a bed 13 of a truck's trailer 14. The cargo 12 as illustrated in FIG. 1 may be a piece of large equipment such as a front-end loader. The securement members 15, 15A, 15B may be chains as illustrated in FIG. 1, for example. The terms "securement members" or "chains" should be understood to refer to any types of components such as chains, straps, cables, wires, ropes etc. that may be used to lock cargo 12 against bed 13.

FIG. 1 shows the chains 15 securing a large or heavy piece of machinery or equipment against a top surface of the bed 13. Chain binders 10 may be used to adjust the tension in those chains 15, i.e., to increase or decrease tension in chains 15. The tension may be increased when it may be desired to more firmly and securely hold cargo 12 against the bed 13. The tension may be decreased when it may be desired to less firmly hold cargo 12 against the bed 13 or when it may be desired to disengage the chains 15 or to remove cargo 12 from bed 13.

FIG. 1 also shows that a connector 16 provided at a first end of each chain or chain section 15 may be engaged with a connector rod 17 provided on the trailer 14. Connector 16 may be a hook that may be permanently secured to a first end of the associated chain section 15A or 15B.

Figure 1A:
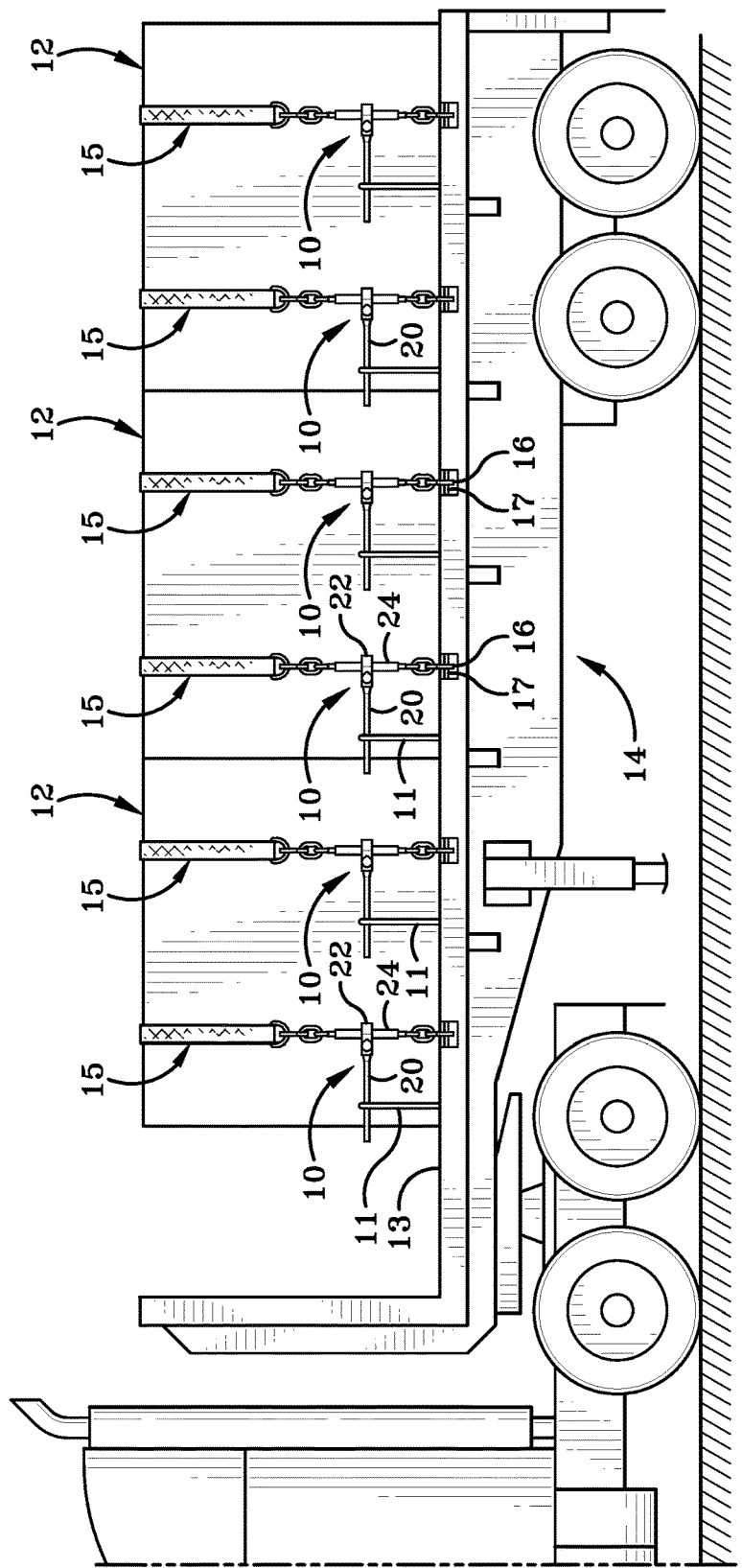
FIG. 1A is a top plan view of a plurality of chain binders in accordance with an aspect of the present invention shown engaged with chains that secure cargo on a truck bed, and wherein the chain binders are placed adjacent a side surface of the cargo.

FIG. 1A depicts a second exemplary manner in which chain binders 10 may be used to chain the tension securement members 15 provided to hold cargo 12 on a bed 13. The cargo 12 depicted in this figure may be a plurality of large containers or boxes that are seated on bed 13. In this instance, the chain binders 10 may be seated against a vertical side wall of the cargo 12 when the cargo may be seated on bed 13. The securement members 15 illustrated in this particular example are straps that have a D-ring connector 16 at a first end. The connector 16 may be used to secure the first end of the securement member 15 to connector rods 17 provided on trailer 14. Once again, chain binders 10 may be used to increase tension in securement members 15 to more firmly secure the cargo 12 on bed 13 or may be used to decrease tension in securement members 15.

Figure 2:
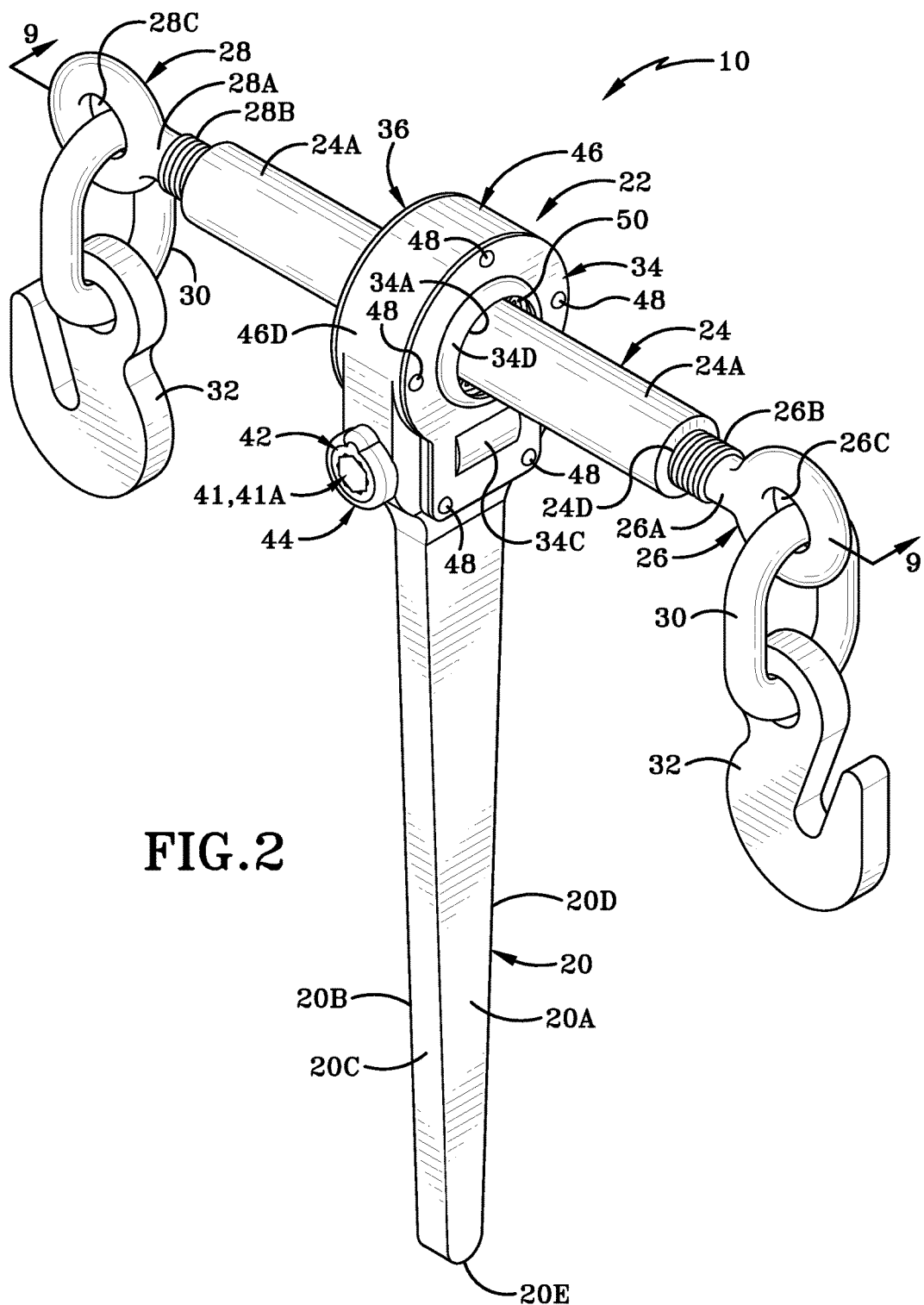
FIG. 2 is an may isometric perspective view of a single chain binder in accordance with an aspect of the present invention.

As depicted in FIG. 2, the chain binder 10 comprises a center body 22 having a lever lock 20 and a tubular member 24 extending outwardly therefrom; a first side assembly (that includes a first eyelet member 26, a chain link 30 and a hook 32); a second side assembly (that includes a second eyelet member 28, a chain link 30 and a hook 32); and a power coupler 41.

Figure 3A:
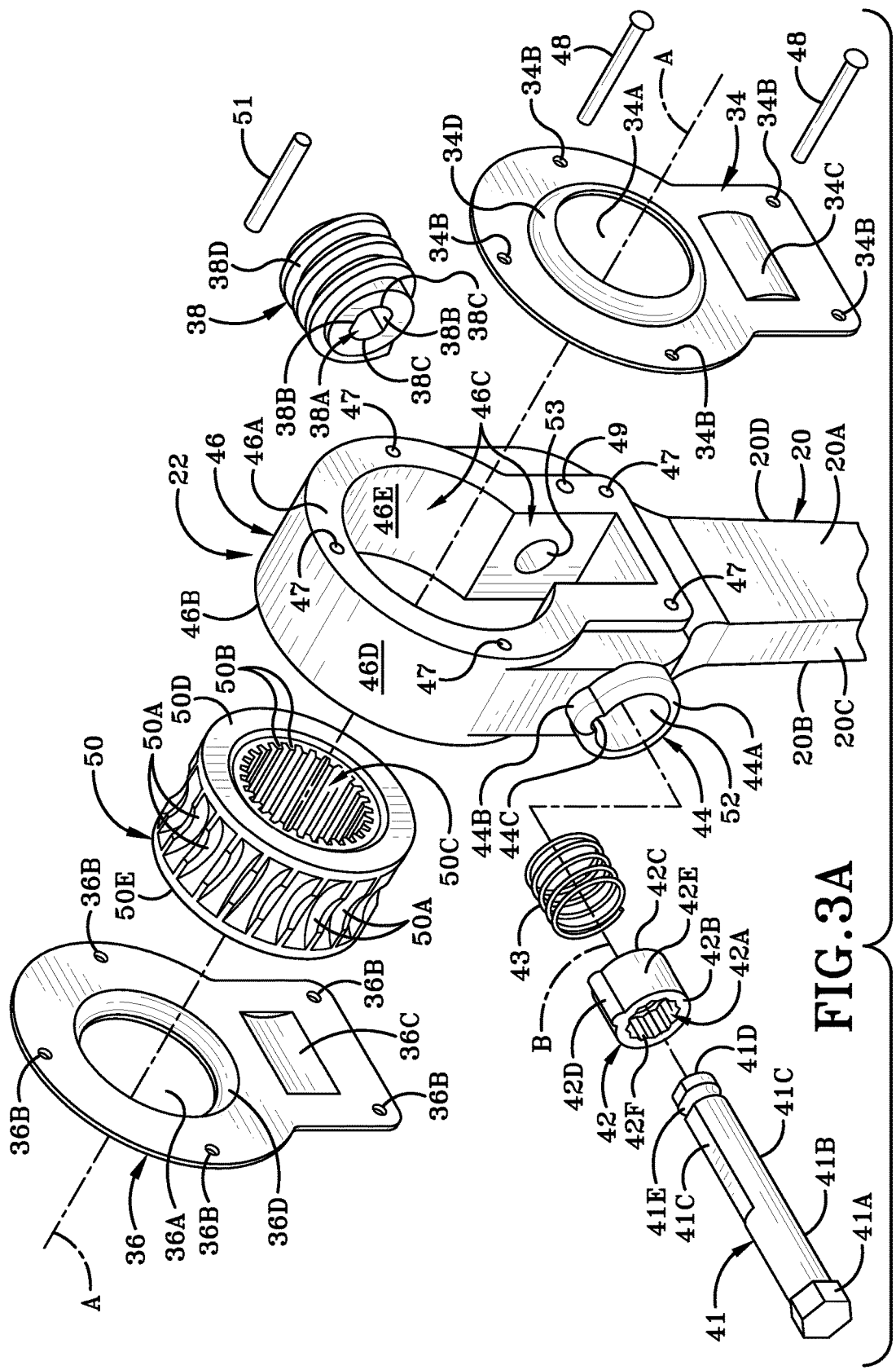
FIG. 3A is an exploded partial may isometric perspective view showing the center body of the chain binder of FIG. 2.

As depicted in FIG. 2 and FIG. 3A, the center body 22 comprises a housing 46 within which may be located a worm 38 and a worm wheel 50. A first cover 34 and a second cover 36 engage the housing 46 to protect worm 38 and worm wheel 50. Center body 22 also includes a plurality of rivets 48, a retaining pin 51, a worm shaft 41, an inner lock sleeve 42, and a spring 43. Lever lock 20 extends outwardly from housing 46 as does tubular member 24. Worm shaft 41 comprises a power coupling that may be selectively engaged with a remote power source to operate chain binder 10. All of these components and the method of operation thereof will be further described hereafter.

As depicted in FIG. 3A, the housing 46 may be generally keyhole-shaped when viewed from a left side or a right side. Housing 46 may have an upper generally circular region and a lower generally rectangular region and may include a first side surface 46A and a second side surface 46B. A through-hole 46C may be defined in housing 46 and through-hole 46C may extend from first side surface 46A through to second side surface 46B. Through-hole 46c may be oriented along a longitudinal axis "A". Through-hole 46C may also include a generally circular region and a generally rectangular region that are in communication with each other. Housing 46 may also have an outer surface 46D, and an inner surface 46E.

The housing 46 may define therein a plurality of first holes 47, a second hole 49, a third hole 52, and a fourth hole 53. Each of the plurality of first holes 47 may extend from first side surface 46A of the housing 46 to the second side surface 46B thereof. First holes 50 may be located at intervals around first and second side surfaces 46A, 46B. The third hole 52 may extend inwardly from one side of outer surface 46D of the housing 46 and terminate in the inner surface 46E that defines through-hole 46C. In particular, the third hole 52 may be in communication with the generally rectangular region of through-hole 46C. The third hole 52 may be oriented generally perpendicular to through-hole 46C and to longitudinal axis "A". A center of the third hole 52 may be aligned along a transverse axis "B" that may be oriented at right angles to longitudinal axis "A". The fourth hole 53 may be defined in inner surface 46E and be located opposite third hole 52 in the generally rectangular region of housing 46. Fourth hole 53 may terminate a distance inwardly from the region of outer surface 46D that may be opposite to the region within which third hole 52 may be defined. This can be seen in FIG. 8. The center of fourth hole 53 may be aligned along transverse axis "B" and fourth hole 53 may be oriented at right angles to longitudinal axis "A". The second hole 49 may extend inwardly from the first side surface 46A of the housing 46 and terminate in fourth hole 53. Second hole 49 and fourth hole 53 may be in communication with each other. The second hole 49 may be oriented generally parallel to longitudinal axis "A". The purpose of the various holes 46C, 47, 49, 52 and 53 will be described later herein.

Housing 46 may further include a boss 44 that extends outwardly from the outer surface 46D of the housing 46 and surrounds and defines third hole 52. Third hole 52 may be in fluid communication with through-hole 46C. The boss 44 may comprise a generally circular end surface 44A that includes a detent 44B that defines a slot 44C therein.

As depicted in FIG. 3A, the worm 38 may have a body that defines a central through-hole 38A which extends from one end of the worm to the other. The through-hole 38A may be generally elliptical in shape having a pair of opposed flat surfaces 38B and a pair of opposed arcuate surfaces 38C. Worm 38 also may have an exterior surface that may have a spiral groove 38D provided therein. Worm 38 may be positioned within the generally rectangular region of through-hole 46C and when so positioned, the hole 38A may be aligned along transverse axis "B" and may be aligned with third hole 52 and fourth hole 53.

As depicted in FIG. 3A, the worm wheel 50 may be received in the generally circular region of the through-hole 46C. Worm wheel 50 may comprise a base that defines a central through-hole 50C which may be oriented along the longitudinal axis "A" when worm wheel 50 is received in through-hole 46C. Worm wheel 50 may further comprise a plurality of splines that form a plurality of outer teeth 50A that extend outwardly from the exterior surface of the base and are positioned to engage the groove 38D of worm 38. The plurality of splines may also form a plurality of inner teeth 50B that extend inwardly from an interior surface of the base and into through-hole 50C (and thereby into through-hole 46C of center body 22). The base of the worm wheel may have a first side surface 50D and a second side surface 50E. The center through-hole 50C of the worm wheel 50 may extend from first surface 50D of the base to second surface 50E thereof.

The first cover 34 may have a first side surface and a second side surface and define a central through-hole 34a that extends between the first and second side surfaces. The first cover may be shaped and sized to be positioned against first side surface 46A of housing 46 and may be therefore generally keyhole shaped. When first cover 34 may be positioned against first side surface 46A of housing 46, the central through-hole 34A on first cover 34 may be positioned proximate the generally circular region of through-hole 46C and may be oriented along the longitudinal axis "A" of housing 46. The first cover 34 may further define a plurality of pin-holes 34B therein that are positioned to align with first holes 47 in housing 46. First cover may also include a worm cover 34C that may be positioned to align with and cover a portion of worm 38. First cover 34 may also include an annular flange 34D that circumscribes through-hole 34A. The worm cover 34C may project outwardly from an exterior surface of the first cover 34. Similarly, flange 34D may extend outwardly from the exterior surface of first cover 34.

Second cover 36 may have a first side surface and a second side surface and define a central through-hole 36A that extends between the first and second side surfaces. Second cover 36 may be shaped and sized to be positioned against second side surface 46B of housing 46 and may be therefore generally keyhole shaped. When second cover 36 may be positioned against second side surface 46B of housing 46, central through-hole 36A on second cover 36 may be positioned proximate the generally circular region of through-hole 46C and may be oriented along the longitudinal axis "A" of housing 46. The second cover 36 may further define a plurality of pin-holes 36B therein that are positioned to align with first holes 47 in housing 46; a worm cover 36C that may be positioned to align with and cover a portion of worm 38; and an annular flange 36D that circumscribes through-hole 36A. Worm cover 36C projects outwardly from an exterior surface of second cover 36. Similarly, flange 36C extends outwardly from the exterior surface of second cover 36.

Figure 13:
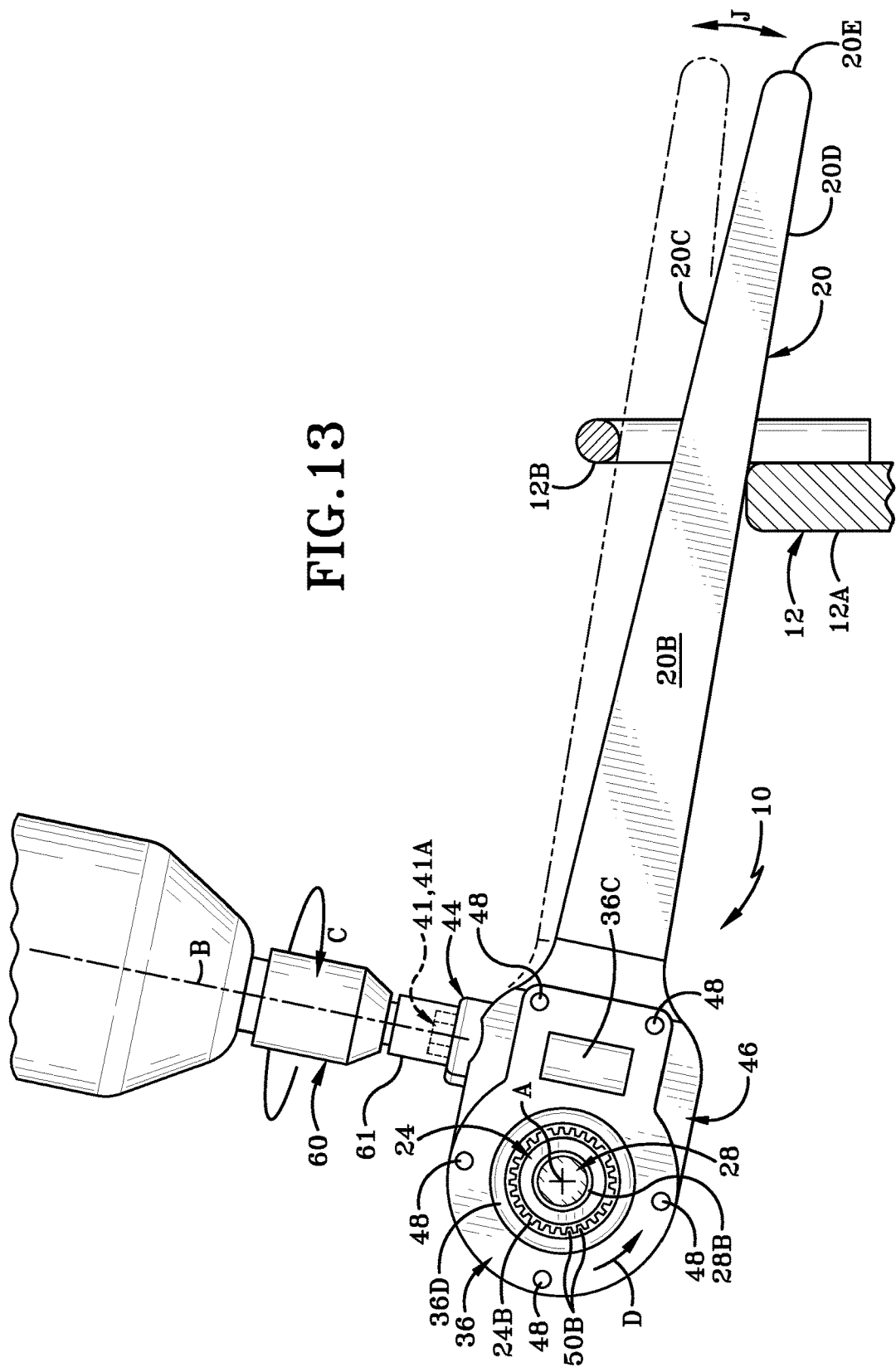
FIG. 13 is a cross-section of the chain binder taken along line 12-12 of FIG. 12 showing the lever lock of the chain binder wedged between two surfaces.

As depicted in FIG. 2 and partially depicted in FIG. 3A, lever lock 20 may extend downwardly from a bottom end 46F of the housing 46 and may be integrally formed therewith. The lever lock 20 may be an elongate member that may have a back surface 20A, a front surface 20B, a first side surface 20C, a second side surface 20D, and a tip 20E. Lever lock 20 may be generally wedge-shaped when housing 46 is seen from one side as is illustrated in FIGS. 2 and 13. Lever lock 20 may taper in width from proximate the bottom end 46F of housing 46 to tip 20E. (The width is the distance measured between first and second side surfaces 20C, 20D.) Tip 20E may be rounded. Each of the back surface 20A, front surface 20B, first side surface 20C and second side surface 20D may be substantially continuous and unbroken, being free of any aperture or holes through which other components may be inserted.

Figure 3B:
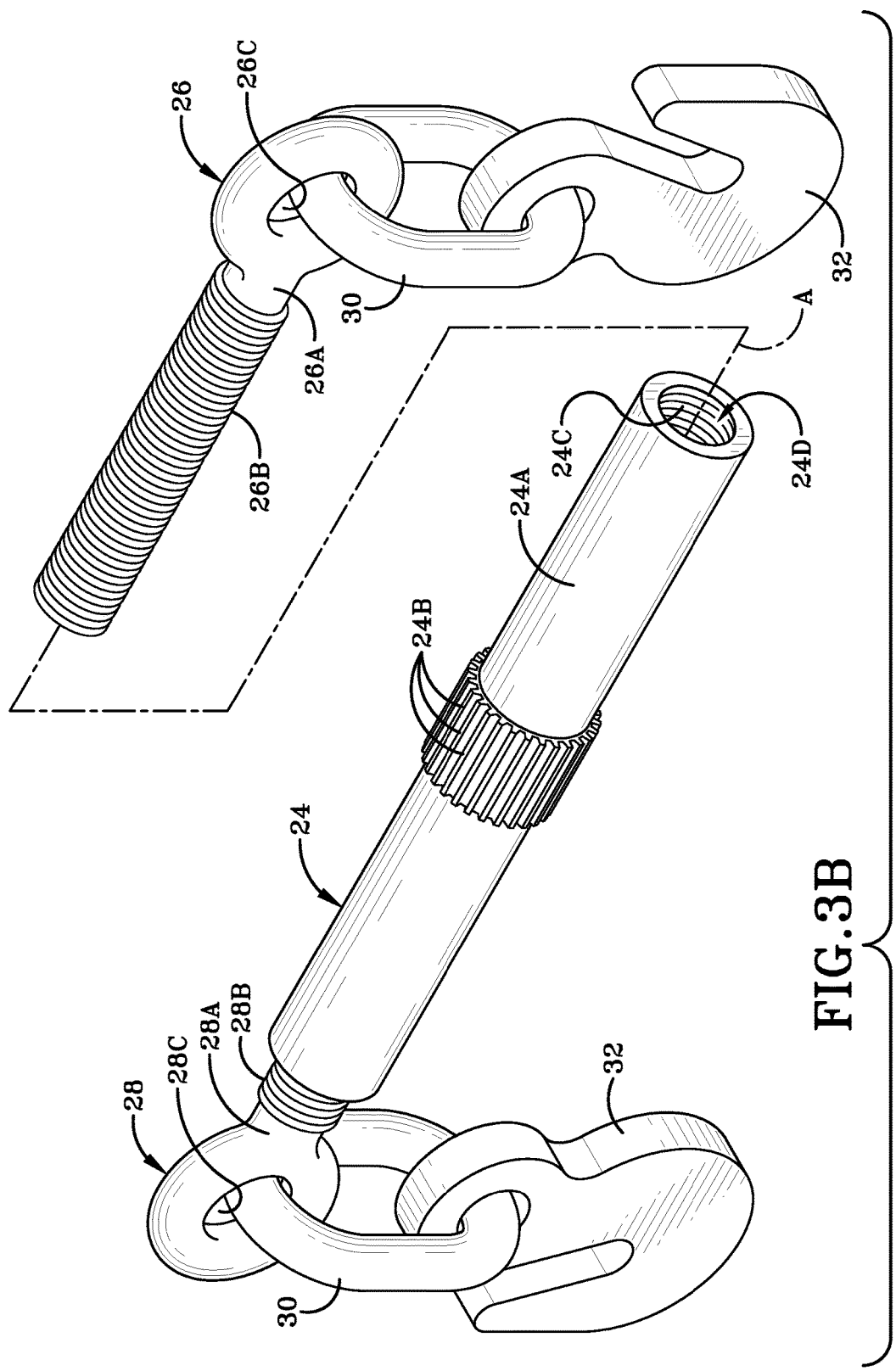
FIG. 3B is an exploded may isometric perspective view of a tubular member of the chain binder.

As depicted in FIG. 3B, tubular member 24 may comprise a generally cylindrical component body 24A that may have an exterior surface that includes, generally centrally, a plurality of teeth 24B that radiate outwardly therefrom. Each tooth 24B may be oriented generally parallel to a longitudinal axis of tubular member 24B, where that axis extends from one end of tubular member 24a to the other. Tubular member 24 may define a bore 24D therein that extends longitudinally from one end of the tubular member to the other. Bore 24D may be provided with an internal thread 24C. Tubular member 24 and the bore 24D thereof may be aligned along the longitudinal axis "A" when tubular member 24 is inserted into hole 46C of center body 22.

Figure 3C:
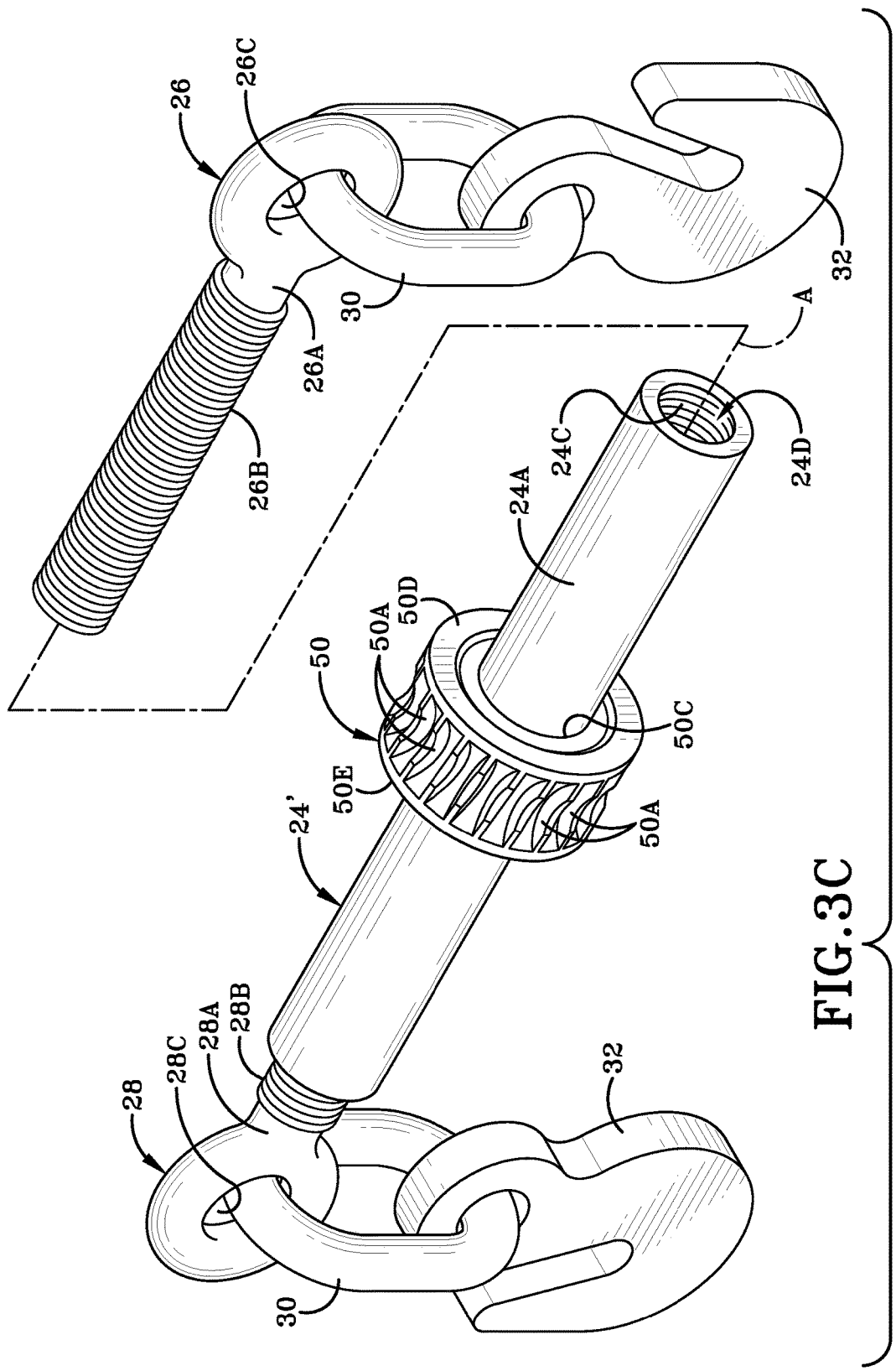
FIG. 3C is an exploded may isometric perspective view of a second embodiment of the tubular member and a worm wheel of the chain binder.

FIG. 3C shows a second embodiment of tubular member, generally indicated at 24'. In this instance, worm wheel 50 may not be provided with splines 50A that extend into hole 50C and/or tubular member 24' may not include any teeth on its exterior surface 24A. Tubular member 24' may extend through hole 50C defined by worm wheel 50 and tubular member 24' may be secured to worm wheel 50 in some other manner, such as by welding. When welded or otherwise together tubular member 24' and worm wheel 50 will rotate in unison.

In each of the tubular members 24 and 24', a first side assembly may be engaged with a first end of tubular member 24, 24' and a second side assembly may be engaged with a second end of tubular member 24, 24'. The second side assembly may thus be spaced a distance away from the first side assembly. The first side assembly may comprise a first eyelet member 26 and a hook 32 that may be connected directly together or are operatively engaged with each other via one or more chain links 30. The second side assembly may comprise a second eyelet member 28 and a hook 32 that may be directly connected together or are operatively engaged with each other via one or more chain links 30. First eyelet member 26 may comprise a shaft 26A that may be provided with an external thread 26B and has an eyelet 26C located at one end of the shaft 26A. Second eyelet member 28 may comprise a shaft 28A that may be provided with an external thread 28B and has an eyelet 28C located at one end of shaft 26A. The threads on shafts of first eyelet member 26 and the second eyelet member 28 may be threaded in opposite directions to each other. In other words, first eyelet member 26 may have a right-handed thread and second eyelet member 28 may have a left-handed thread, or vice versa. The threaded shafts 26A and 26B are threadably engaged with the inner threads 24C at opposite ends of the bore 24D of tubular member 24. When tubular member 24 is rotated in a first direction about the longitudinal axis "A", both of the shafts of the first eyelet member 26 and second eyelet member 28 may be threaded further inwardly into bore 24D. Thus, the distance between first eyelet 26C and second eyelet 28C may be reduced. When tubular member 24 is rotated in a second direction about the longitudinal axis "A", both of the shafts of first eyelet member 26 and second eyelet member 28 may be threaded further outwardly from bore 24D. Thus, the distance between first eyelet 26C and second eyelet 28C may be increased.

The links 30 may be permanently connected with eyelet 26C of first eyelet member 26 and with eyelet 28C of second eyelet member 28. The hooks 32 may also be permanently connected with chain links 30. Each hook 32 may be contemplated to selectively be operatively engaged with a section of a chain 15A, 15B that may be provided to secure cargo 12 to truck bed. 13 A first end of each of the first and second chain sections 15A, 15B may be secured to truck bed 13 via connection rods 17 mounted within notches on the truck bed 13 or on trailer 14. Hooks 32 may be engaged with hooks 16 or any other suitable type of connector 16 provided on the free ends of the first and second chain sections 15A, 15B. This is shown in FIG. 1.

It should be noted that first and second chain sections 15A, 15B may be opposite ends of the same single chain or may be ends of two different chains. The tension on the chain (or chains or chain sections) 15, 15A, 15B may be increased by rotating the tubular member 24 in a first direction and may be decreased by rotating the tubular member 24 in a second direction or vice versa.

As shown in FIG. 3A, a power coupling is provided on center body 46. Power coupling may take the form of a worm shaft 41 that is provided to adjust the position or orientation of worm 38. The worm shaft 41 may comprise a hexagonally-shaped head 41A provided at one end of a shaft 41B. A pair of opposed flat portions 41C may be provided on the shaft 41B a distance from head 41A and proximate an end 41D. Shaft 41B may also define an annular groove 41E therein. The shaft 41B may extend from head 41A to end 41D and groove 41E may be located between the two flat portions 41C and the end 41D.

Figure 4:
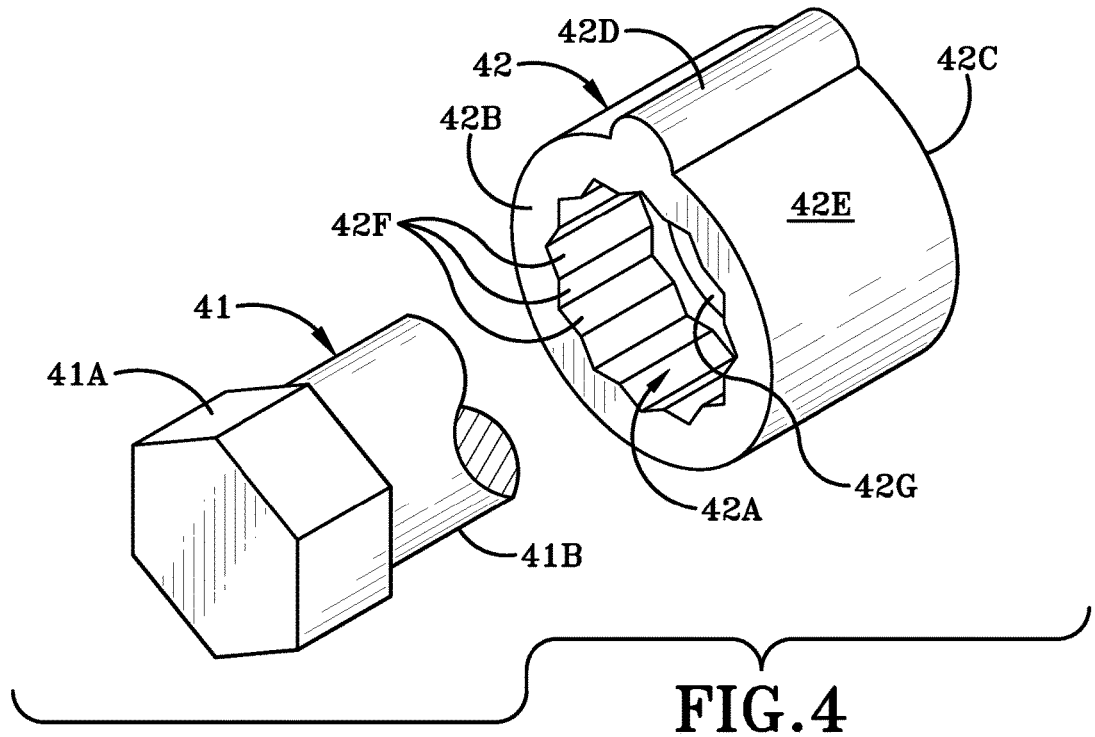
FIG. 4 is an exploded partial may isometric perspective view of a worm shaft and a lock sleeve of the chain binder.
Figures 5, 6:
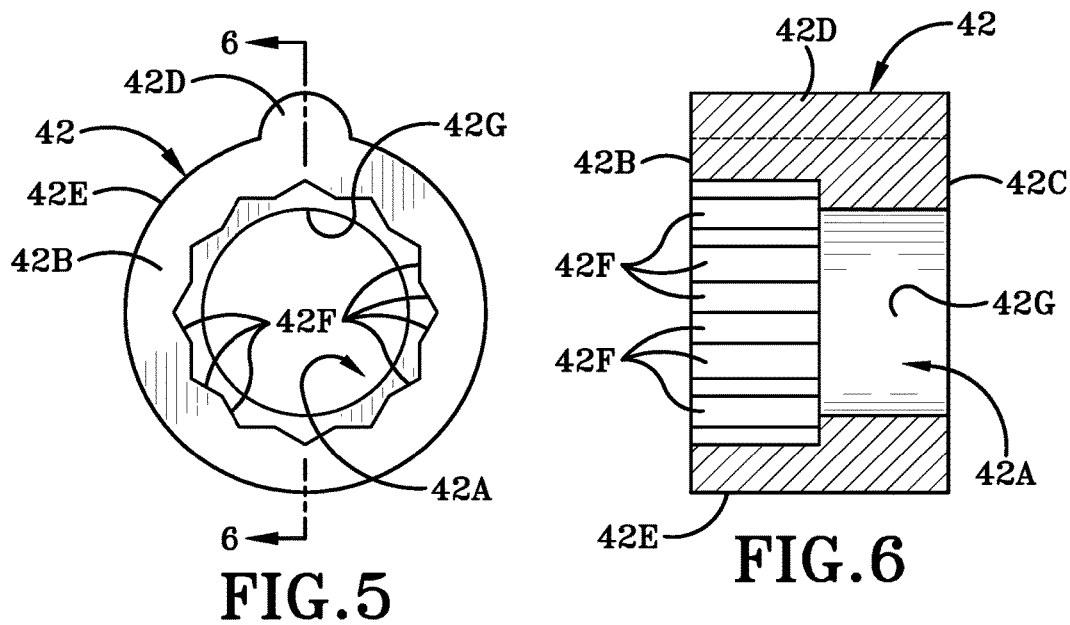
FIG. 5 is a side elevation view of the worm shaft and the lock sleeve of FIG. 4.
FIG. 6 is a partial cross section view of the worm shaft and the lock sleeve taken along line 6-6 FIG. 5.

As shown in FIG. 4, FIG. 5, and FIG. 6, a lock sleeve 42 may be provided for engagement with worm shaft 41. Lock sleeve 42 may comprise an annular body defining a bore 42A therein which extends between a front surface 42B and a rear surface 42C of the body. A longitudinal detent 42D may extend outwardly from an outer surface 42E of the body of lock sleeve 42. Bore 42A may comprise a first region having a plurality of longitudinally extending teeth 42F and a second region having a smooth inner surface 42G. When lock sleeve 42 is engaged with center body 22, bore 42A of lock sleeve 42 may be aligned along transverse axis "B". Shaft 41B of worm shaft 41 may be inserted through bore 42A of lock sleeve 42 and through a center of a coil spring 43, and may then be inserted into hole 38A of worm 38. Finally, the end 41D of worm shaft 41 may be received in fourth hole 53 in center body 22. Thus, shaft 41B may be aligned along transverse axis "B". Retaining pin 51 may be inserted through fourth hole 49 and into groove 41E on worm shaft 41. Engagement of retaining pin 51 with worm shaft 41 substantially prevents worm shaft 41 from being withdrawn from center body 46. Worm shaft 41 can be removed from center body by pulling retaining pin 51 out of second hole 49 and then withdrawing worm shaft 41 from lock sleeve 42.

As shown in FIG. 5 and FIG. 6, a diameter of the first region of bore 42A of lock sleeve that includes teeth 42F may be larger than a diameter of the second region that may have the smooth inner surface 42G. Furthermore, as shown in FIG. 4, a diameter of the hexagonal head 41A of worm shaft 41 may be smaller than a diameter of the first region of lock sleeve 42 that includes teeth 42F. Similarly, a diameter of the shaft 41B may be smaller than a diameter of the second region of lock sleeve 42 that includes smooth inner surface 42G so that the shaft 41B can tightly pass through bore 42A of the second region of lock sleeve 42. Lock sleeve 42 may be sized to have an exterior shape and diameter that may be complementary to aperture 52 defined in boss 44 on center body 22. Lock sleeve 42 may be engaged in third hole 52 of boss 44 and longitudinal detent 42D on lock sleeve 42 aligns with and may be received in slot 44C of boss 44. The engagement of detent 42D in slot 44C substantially prevents rotation of lock sleeve 42 about the transverse axis "B". Furthermore, when head 41A of worm shaft 41 is received within bore 42A of lock sleeve 42, the teeth 42F in the first region of bore 42A engage the faces on the hexagonal head 41A of worm shaft 41A, thus preventing rotation of worm shaft 41 about the transverse axis "B".

Figure 11:
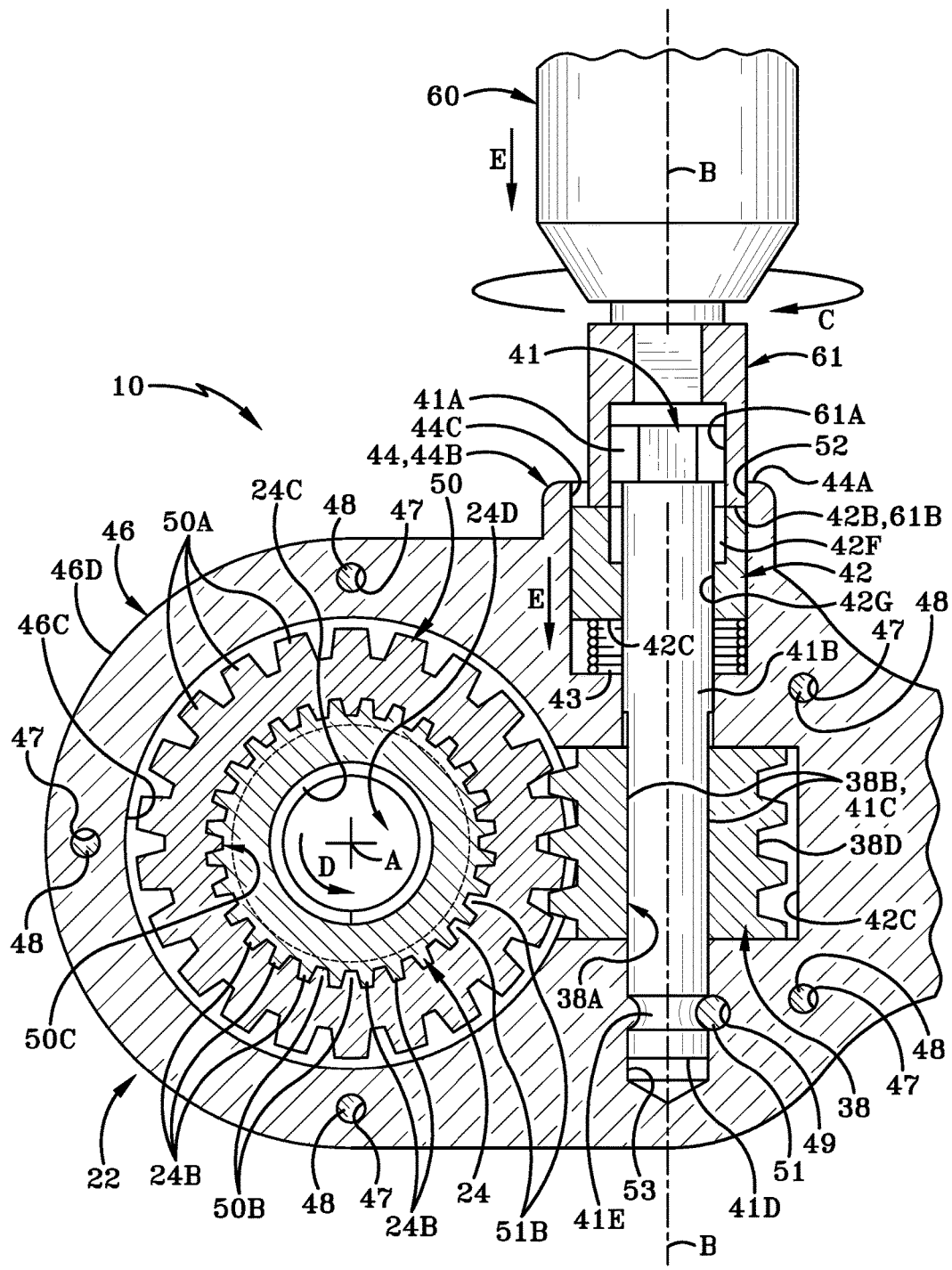
FIG. 11 a cross-section of the chain binder taken along line 11-11 of FIG. 10 and showing a power source coupled with the power coupling of the chain binder.

When an operator desires to turn worm shaft 41 to adjust tension in the securement members 15, then the operator will push lock sleeve 42 inwardly in the direction of arrow "E" (FIG. 11). This pushing motion may be accomplished with the operator's fingertips or with a tool such as a flat-head screwdriver or with a socket provided on the power source, as will be later described herein. As lock sleeve 42 moves in the direction of arrow "E" the sleeve 42 slides into third hole 52 of center body 46, compressing spring 43 as it moves. The motion of lock sleeve 42 in this manner allows head 41A of worm shaft 41 to disengage from teeth 42F of lock sleeve 42 and head 41A becomes exposed. Head 41A may be engaged with a remote power source, such as a powered drill 60 (FIG. 11 or FIG. 13). A socket 61 may be engaged on a driver of the drill 60 and the socket 61 may be engaged with head 41A on worm shaft 41. Drill 60 is actuated to rotate socket 61. Operation of drill 60 will cause socket 61 and thereby head 41A and thereby worm shaft 41 to rotate about the transverse axis "B". The operator can select to operate drill 60 to rotate worm shaft 41 in either of a first direction or a second direction, depending on whether first assembly 26 and second assembly 28 need to be moved towards each other or away from each other. This will be further discussed later herein.

Figure 7:
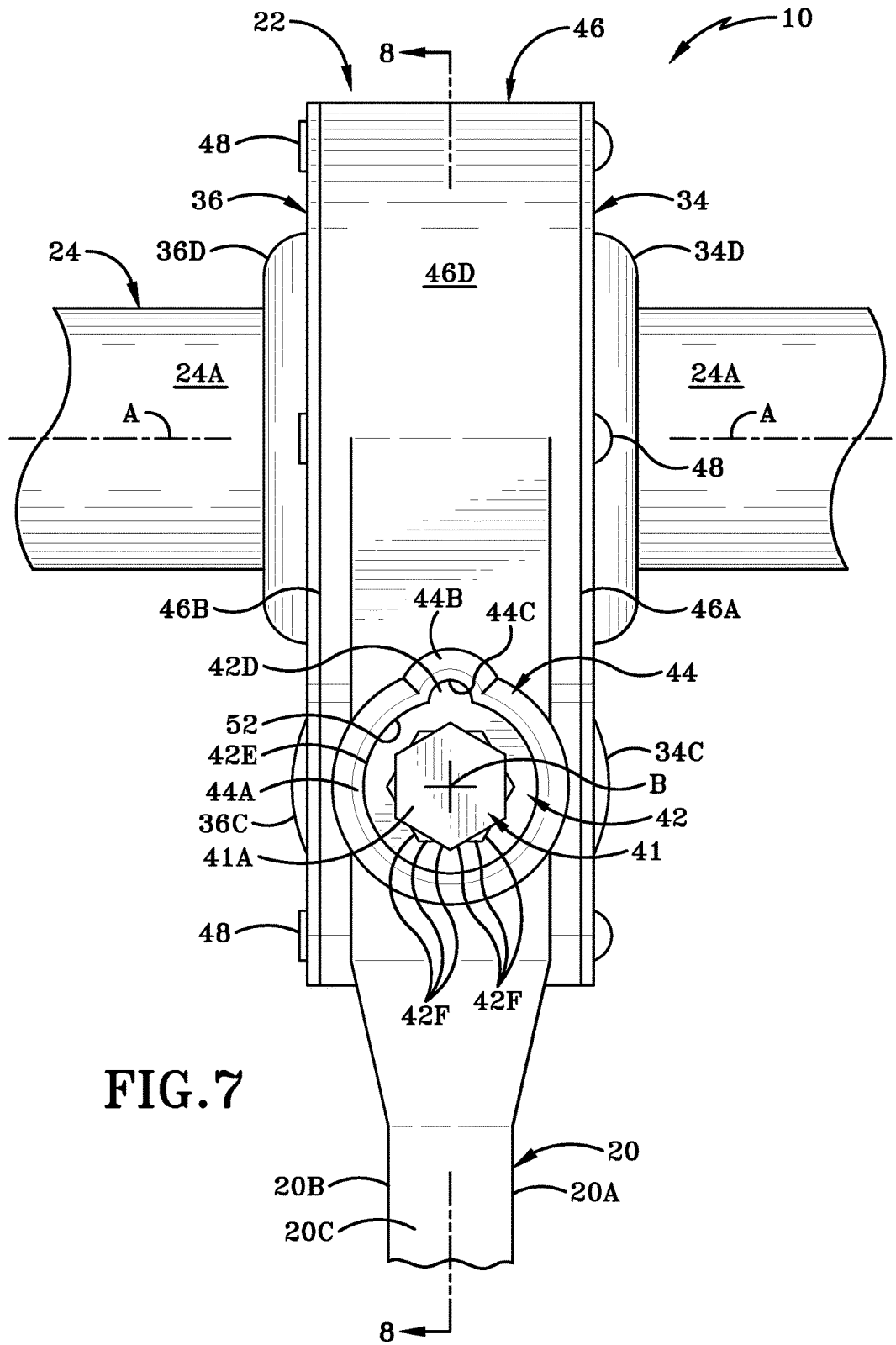
FIG. 7 is a partial side elevation view of the chain binder showing the center body and tubular member engaged with each other.
Figure 8:
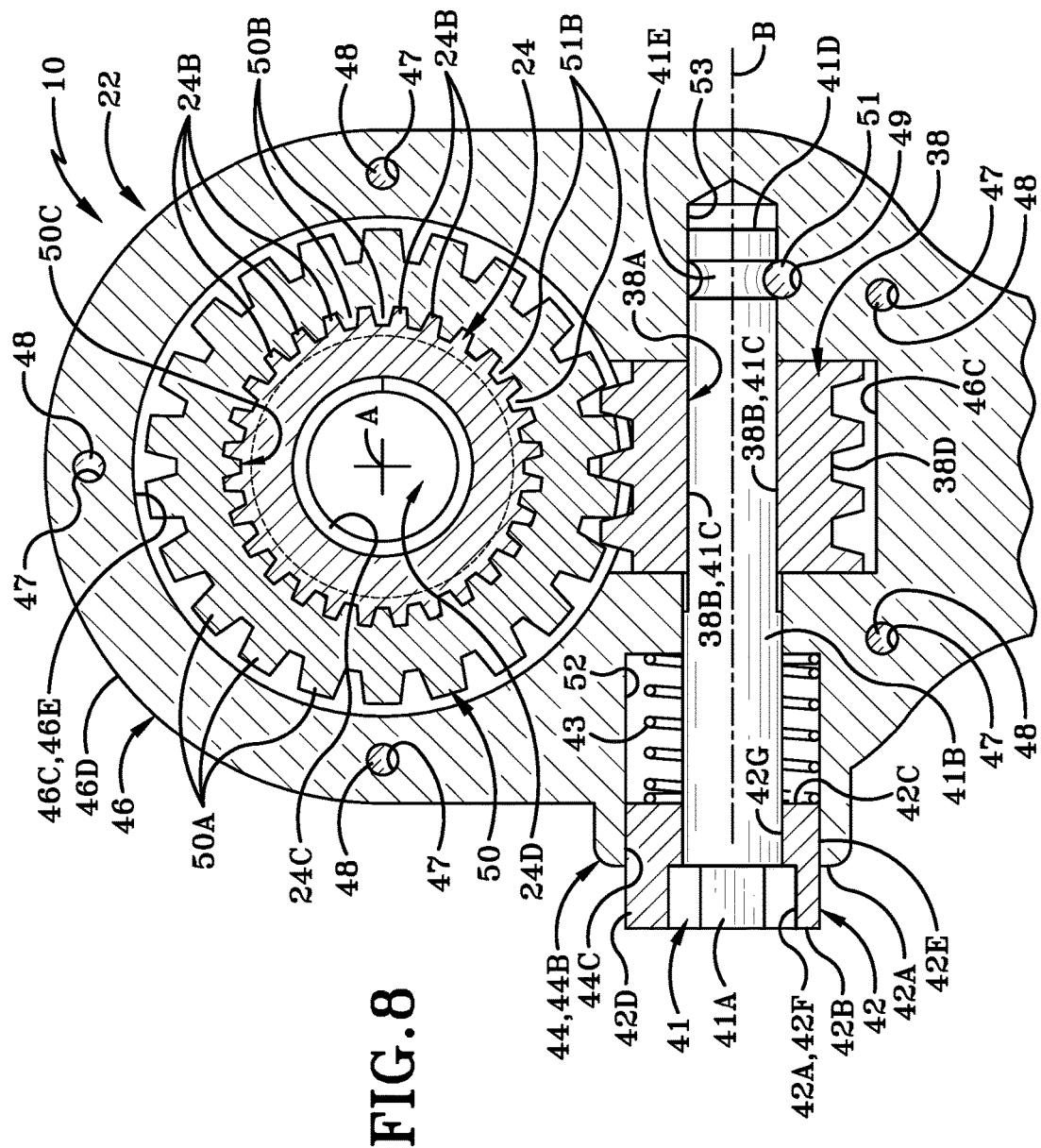
FIG. 8 is a cross-section of chain binder taken along line 8-8 of FIG. 7.

As depicted in FIG. 3A, FIG. 7, and FIG. 8, worm wheel 50 and worm 38 may be located within central through-hole 46C of main housing 46 in such a manner that outer teeth 50A of the splines extend outwardly from worm wheel 50 and engage in groove 38D of worm 38. Worm shaft 41, the lock sleeve 42, and the spring 43 may be inserted through the third hole 52 as described above. End 41D of worm shaft 41 may be anchored in fourth hole 53 of main housing 46 by retaining pin 51 as described above. As worm shaft 41 is inserted through through-hole 38A of worm 38, flat portions 41C of worm shaft 41 are fittingly engaged with flat surfaces 38B that define portions of the through-hole 38A of worm 38.

Tubular member 24 may be inserted into through-hole 50C of worm wheel 50 and thereby into central through-hole 46C of main housing 46. Tubular member 24 is oriented along the axis "A". Teeth 24B on the exterior surface of tubular member 24 (if provided) may be interlockingly engaged with inner teeth 50B on the splines of the worm wheel 50 as these inner teeth project into through-hole 50C and thereby into through-hole 46C. Alternatively, as illustrated in FIG. 3C worm wheel 50 and tubular member 24' are a single member that is positioned in center body 46 in the same orientation as worm wheel 50 and tubular member 24.

As shown in FIG. 3, FIG. 7, and FIG. 8, first cover 34 may be attached to first side surface 46A of housing 46 and second cover 36 may be attached to second side surface 46B of housing 46 utilizing rivets 48.

Figure 9:
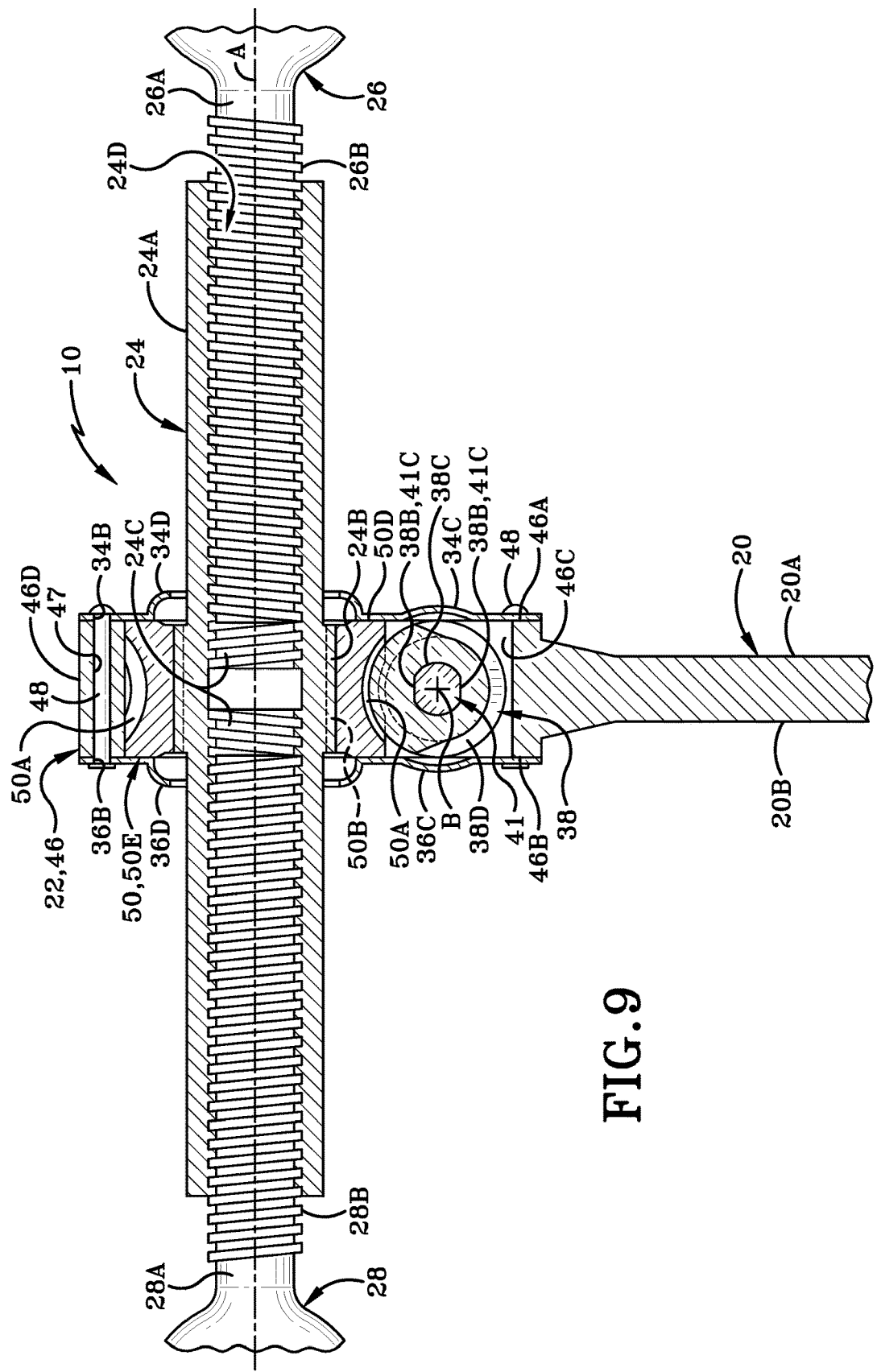
FIG. 9 is a cross-section of chain binder taken along line 9-9 of FIG. 2.
Figure 10:
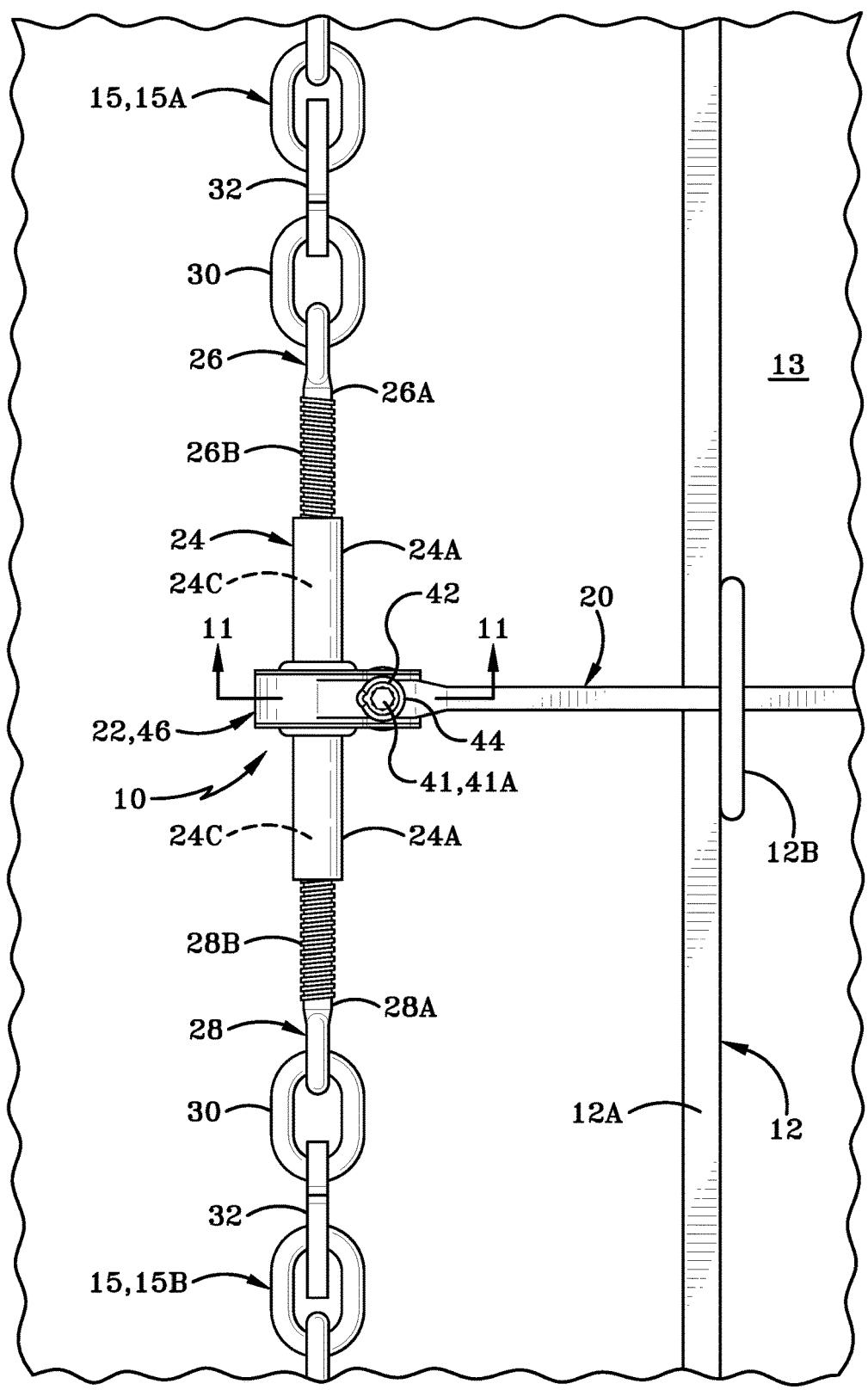
FIG. 10 is a top plan view of the chain binder of FIG. 1 shown engaged with a chain that secures a piece of equipment on a truck bed.

Once tubular member 24 is engaged with worm wheel 50, the first side assembly may be engaged with a first end of tubular member 24 and the second side assembly may be engaged with a second end of tubular member 24. As shown in FIG. 9, the shaft 26B of the first eyelet member 26 and the shaft 28B of the second eyelet member 28 are threadably engaged with the threads 24C provided in the bore 24D of the tubular member 24.

In operation, as shown in FIGS. 10-13 and previously mentioned herein, first and second chain sections 15A, 15B may comprise opposed ends of sections of the same chain or they may be ends of two separate chains. The first chain section 15A may be secured or otherwise engaged with the truck bed 13 such as by engagement to connector rods 17. Alternatively chain 15 may be passed around a bottom surface of the truck bed 13 and may be then passed across the cargo 12 in a first direction. The second chain section may be secured or otherwise engaged with the truck bed 13 or may be passed around a bottom of the truck bed 13 and then be passed across the cargo 12 in a second direction. The chain binder 10 may be engaged with the first and second chain sections 15A, 15. This may be accomplished by engaging the hook 32 on the first eyelet member 26 with a link on the first chain section 15A and engaging the hook 32 on the second eyelet member 28 with a link on second chain section 15B.

Prior to attempting to adjust the tension in the chain (i.e., first chain section 15A and second chain section 15B) lever lock 20 may be secured against rotation. This may be accomplished by restraining lever lock 20 against rotation in any suitable manner. For example, as shown in FIG. 13, a free end of lever lock 20 may be wedged between a first surface and a second surface 12A, 12B. These surfaces 12A, 12B may be two surfaces on the cargo 12 that are spaced apart and are suitable for preventing rotation of lever lock 20 without being damaged. In other instances, the first surface 12A may be a part of the cargo 12 and the second surface 12B may be on the truck bed 17. In other instances, such as is illustrated in FIG. 1A, a rope or cable can be used to hold lever lock 20 against a side of the cargo 12 being transported.

Once lever lock 20 is prevented from being able to rotate, a power source may be engaged with the power coupling on chain binder 10. For example, a powered drill 60 (FIG. 11) may be engaged with head 41A of worm shaft 41 as described earlier herein. Drill 60 may include a socket 61 having a bore 61A shaped, sized and configured to be complementary to the head 41A of worm shaft 41. An end 61B of socket 61 may be sized to contact an end surface of lock sleeve 42 and be used to push lock sleeve 42 in the direction of arrow "E" towards center body 22. As the end 61B of the socket 61 pushes the lock sleeve 42 inwardly into boss 44, the complementary hexagonal bore 61A of the socket 61 becomes snuggly engaged with the hexagonal head 41A of the worm shaft 41. Drill 60 may then be selectively actuated to rotate worm shaft 41 in a first direction or a second direction. As soon as drill 60 begins to rotate worm shaft 41, the rotational motion tends to be transferred to housing 46 and thereby to lever lock 20. Because lever lock 20 has been secured against rotation (see FIG. 13), most motion in either direction illustrated by arrow "J" may be substantially prevented. The securing of lever lock 20 against rotation thereby tends to prevent an operator from being hit by a rotating lever lock 20. Motion imparted by drill 60 rotates the worm shaft 41 about axis "B".

As illustrated in the figures, drill 60 may be operated to rotate worm shaft 41 in a first direction, such as a clockwise direction "C". As worm shaft 41 rotates about axis "B", worm 38 engaged on worm shaft 38 may be, in turn, rotated about the axis "B" in unison with shaft 41B. Consequently, worm 38 may be also rotated in a clockwise direction "C". Worm 38 in turn rotates worm wheel 50 around longitudinal axis "A". Rotation of worm wheel 50 occurs in a counter-clockwise direction "D" because of the interlocking engagement of the outer teeth 50A of worm wheel 50 and groove 38D of worm 38. Inner teeth 50B of the splines (if provided) of worm wheel 50 engage teeth 24B on the exterior of tubular member 24 and therefore counter-clockwise "D" rotation of tubular member 24 may be initiated. Alternatively, as shown in FIG. 3C, if tubular member 24 is welded to worm wheel 50, when worm wheel 50 is rotated by worm 38, then tubular member 24 will rotate in unison with worm wheel 50 in the direction "D".

Figure 12:
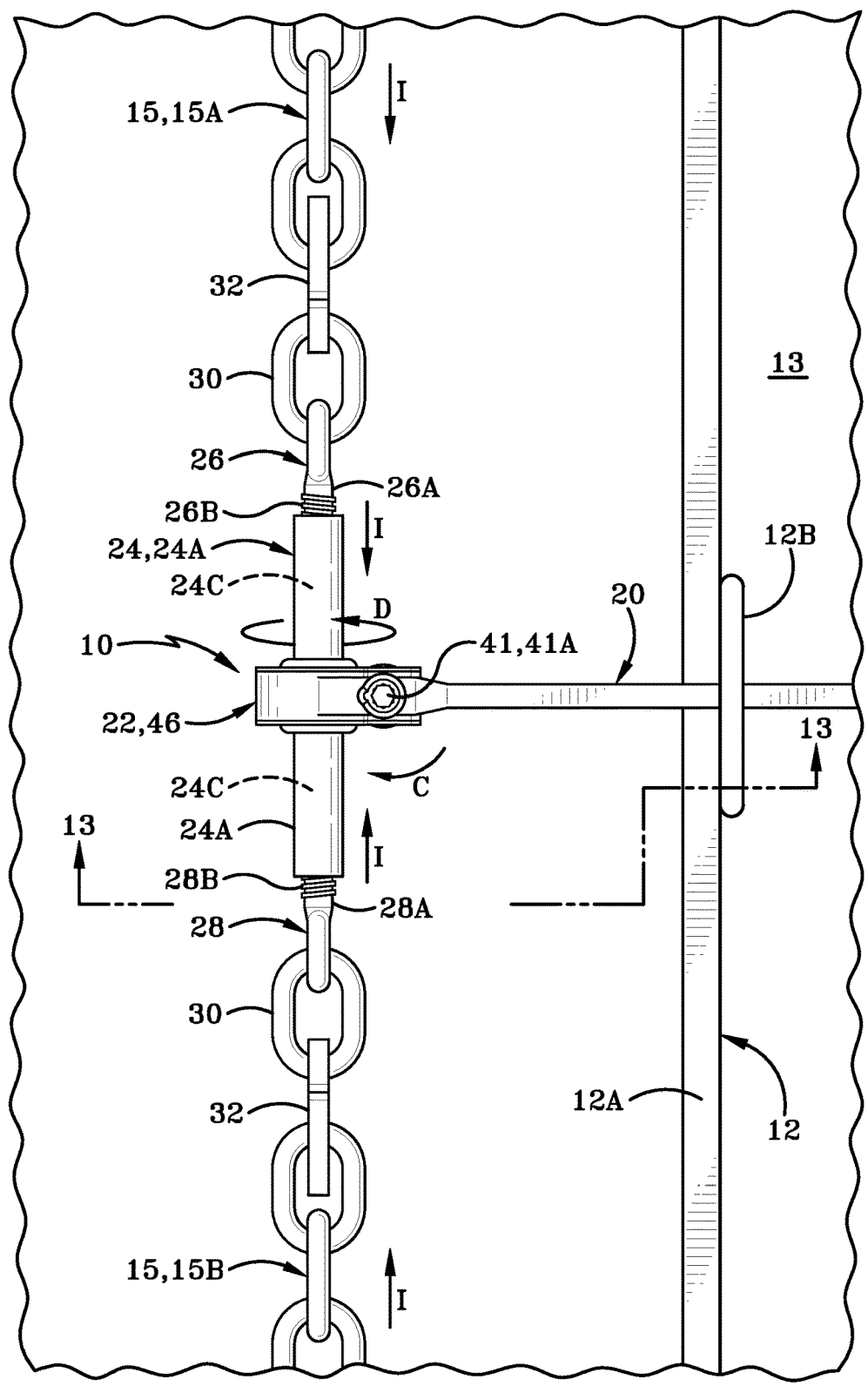
FIG. 12 is a top plan view of the chain binder showing the tubular member being rotated in a first direction.

As shown in FIG. 12, as tubular member 24 rotates about longitudinal axis "A" in the counter-clockwise direction "D", first eyelet member 26 and second eyelet member 28 are both retracted inwardly towards each other along the longitudinal axis "A". This inward movement is indicated by an arrow "I" (FIG. 12). The eyelet members tend to move inwardly because the eyelets 26A, 28A are retained in a substantially stationary position by the first and second chain sections 15A, 15B to which they are engaged.

As the drill 60 continues to rotate in the first direction, the socket 61 continues to rotate worm shaft 41 and thereby worm 38 and thereby worm wheel 50 and thereby tubular member 24; the eyelet members 26, 28 continue to move inwardly towards each other. Thus, the distance between eyelets 26A, 28A continues to decrease and therefore tension in the first and second chain sections 15A, 15B increases. Once the operator decides the tension in first and second chain sections 15A, 15B may be at the desired level, he or she switches off drill 60 and disengages socket 61 from head 41A of worm shaft 41. Lock sleeve 42 will then tend to move in the opposite direction to arrow "E" as spring 43 returns to its original shape and position.

If, on the other hand, it is desired to release cargo 12 from truck bed 13, then the direction of rotation of drill 60 and therefore socket 61 may be reversed. Consequently, the directions of rotation of worm shaft 41, worm 38, worm wheel 50, and tubular member 24 are reversed. Worm shaft 41 and worm 38 may then rotate in a counter-clockwise direction; and worm wheel 50 and tubular member 24 may rotate in a clockwise direction. This reversed rotation of tubular member 24 causes the shafts 26B, 28B of the first and second eyelet members 26, 28 to be partially unscrewed from the threads 24C in bore 24D of tubular member 24. Thus, the distance between the eyelets 26, 28 increases and the tension on the first and second chain sections 15A, 15B may be reduced. If it is desired to completely remove the cargo 12 from the truck bed 13 then chain binder 10 may be unhooked from one or both of first and second chain sections 15A, 15B or the chains will be disengaged from connector rods 17 (FIG. 1). Cargo 12 may then be removed from the truck bed 13.

It will be understood that, due to design of the internal thread 24C of tubular member 24 and the external threads of the first and second eyelet members, the externally threaded eyelet members 26, 28 may be screwed into bore 24D of tubular member 24 as worm shaft 41 is rotated in the clockwise direction, provided both eyelet members 26, 28 are bound by first and second chain sections 15A, 15B However, by modifying the configuration of internal thread 24C of tubular member 24 and external threads of eyelet members 26, 28, eyelet members 26, 28 may be unscrewed from bore 24C of tubular member if worm shaft 41 is rotated in the counter-clockwise direction when both eyelet members 26, 28 are restrained by first and second chain members 15A, 15B.

It will further be understood that instead of the manner described above for threadable engagement of the tubular member 24 and first and second eyelets 26, 28, the tubular member may be externally threaded and the eyelet members 26, 28 may define internally threaded bores into which the tubular member may be received.

It will be understood that the chain binder 10 may be fabricated from metal or any combination of metals, or other suitably strong and even reinforced materials.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention may be not limited to the exact details shown or described.

What may be claimed:

1. A chain binder comprising:
a center body;
a first side assembly;
a second side assembly; and
a power coupling provided on the center body; wherein the power coupling may be adapted to couple to an external power source; wherein operation of the power coupling moves the first side assembly and the second side assembly towards each other when operated in a first direction; and operation of the power coupling moves the first side assembly and the second side assembly away from each other when operated in a second direction; wherein the power coupling comprises a worm shaft; a lock sleeve that may be selectively engaged with the worm shaft; wherein the lock sleeve may be movable between a first position where rotation of the worm shaft may be prevented; and a second position where the worm shaft is rotatable; a spring and when a force may be applied to the lock sleeve to move the lock sleeve from the first position to the second position, the spring may be compressed; and when the force may be removed the spring returns to an uncompressed state and the lock sleeve moves from the second position to the first position; a worm provided on the worm shaft.

2. The chain binder as defined in claim 1, further comprising a worm wheel operatively engaged with the worm.

3. The chain binder as defined in claim 2, further comprising a tubular member engaged with the worm wheel; wherein the first assembly may be engaged with a first end of the tubular member and the second assembly may be engaged with a second end of the tubular member.

4. The chain binder as defined in claim 3, wherein the tubular member rotates in unison with the worm wheel.

5. The chain binder as defined in claim 4, wherein the worm wheel defines a hole therein and the tubular member may be received through the hole; and wherein one or more teeth extend outwardly from an exterior surface of the tubular member and one or more splines are provided on the worm wheel and extend inwardly into the hole; and wherein the one or more teeth are interlockingly engaged with the one or more splines.

6. The chain binder as defined in claim 4, wherein the tubular member and worm wheel are welded together.

7. The chain binder as defined in claim 1, further comprising a lever lock extending outwardly from the center body.

8. The chain binder as defined in claim 7, wherein the center body defines a hole therein that extends from a first surface of the center body to a second surface thereof; and wherein a tubular member extends through the hole and may be rotatable therein around an axis that extends along a length of the tubular member; and wherein the lever lock may be oriented at right angles to the tubular member.

9. In combination:
a chain binder comprising:
a center body;
a first side assembly;
a second side assembly; and
a power coupling provided on the center body; and
a power source; wherein the power coupling may be selectively coupled to the power source; and wherein actuation of the power source operates the power coupling; wherein operation of the power coupling moves the first side assembly and the second side assembly towards each other when operated in a first direction; and operation of the power coupling moves the first side assembly and the second side assembly away from each other when operated in a second direction; wherein the power coupling comprises a worm shaft; a lock sleeve that may be selectively engaged with the worm shaft; wherein the lock sleeve may be movable between a first position where rotation of the worm shaft may be prevented; and a second position where the worm shaft is rotatable; a spring and when a force may be applied to the lock sleeve to move the lock sleeve from the first position to the second position, the spring may be compressed; and when the force may be removed the spring returns to an uncompressed state and the lock sleeve moves from the second position to the first position; a worm provided on the worm shaft.

10. The combination as defined in claim 9, wherein the power source may be a hand-held drill.

11. The combination as defined in claim 10, wherein the hand-held drill includes a socket driver that may be selectively engageable with the power coupling.

12. A method of adjusting a tension in a securing member that secures cargo to a support surface, said method comprising steps of:
providing a center body, a first side assembly and a second side assembly;
engaging a first securing member section with the first side assembly;
engaging a second securing member section with the second side assembly;
engaging a power coupling provided on the center body to an external power source;
actuating the external power source;
operating the power coupling in a first direction to move the first and second side assemblies towards each other; or
operating the power coupling in a second direction to move the first and second side assemblies away from each other; wherein the power coupling comprises a worm shaft; a lock sleeve that may be selectively engaged with the worm shaft; wherein the lock sleeve may be movable between a first position where rotation of the worm shaft may be prevented; and a second position where the worm shaft is rotatable; a spring and when a force may be applied to the lock sleeve to move the lock sleeve from the first position to the second position, the spring may be compressed; and when the force may be removed the spring returns to an uncompressed state and the lock sleeve moves from the second position to the first position; a worm provided on the worm shaft.

13. The method as defined in claim 12, further comprising a step of:
preventing rotation of a lever lock provided on the center body prior to operating the power coupling in either of the first direction or the second direction.

14. The method as defined in claim 13, wherein the step of preventing rotation of the lever lock comprises:
wedging a part of the lever lock between a first region and a second region on one or both of the cargo and the support surface.

15. The method as defined in claim 12, wherein the power coupling may be the worm shaft and the power source may be a hand-held drill and the step of engaging the power coupling comprises:
engaging a socket with the drill;
positioning the socket around a head of the worm shaft that extends into an interior of the center body;
actuating the drill; and
rotating the worm shaft.

16. The method as defined in claim 15, wherein the step of positioning the socket further comprises:
contacting the lock sleeve surrounding the head of the worm shaft;
pushing the lock sleeve towards the center body; and
receiving the head of the worm shaft into a bore defined by the socket.

17. The method as defined in claim 15, further comprising:
rotating the worm located on the worm shaft;
engaging the worm with a worm wheel located within the center body; and
rotating the worm wheel in response to rotation of the worm.

18. The method as defined in claim 17, further comprising:
engaging a tubular member with the worm wheel; where the first side assembly may be provided at a first end of the tubular member and the second side assembly may be provided at a second end of the tubular member; and
rotating the tubular member in unison with the worm wheel in either of a first direction or a second direction.

19. The method as defined in claim 18, further comprising:
threadably engaging a first eyelet shaft of the first side assembly with the first end of the tubular member; and
threadably engaging a second eyelet shaft of the second side assembly with the second end of the tubular member.

20. The method as defined in claim 19, further comprising:
reducing a distance between an eyelet on the first eyelet shaft and an eyelet on the second eyelet shaft when the tubular member may be rotated in the first direction.

21. The method as defined in claim 20, further comprising:
increasing tension in the securing member as the tubular member rotates in the first direction.

22. The method as defined in claim 19, further comprising:
increasing a distance between an eyelet on the first eyelet shaft and an eyelet on the second eyelet shaft when the tubular member may be rotated in the second direction.

23. The method as defined in claim 22, further comprising:
reducing tension in the securing member when the tubular member may be rotated in the second direction.

* * * * *